Jan. 13, 1959

P. G. CLOUD ET AL 2,868,501

PORTABLE FLUID-PRESSURE-ACTUATED JACK

Filed May 24, 1954

INVENTORS.
PRYOR G. CLOUD,
JOHN M. CLOUD,
By
ATTORNEY.

Jan. 13, 1959 P. G. CLOUD ET AL 2,868,501
PORTABLE FLUID-PRESSURE-ACTUATED JACK
Filed May 24, 1954 2 Sheets-Sheet 2
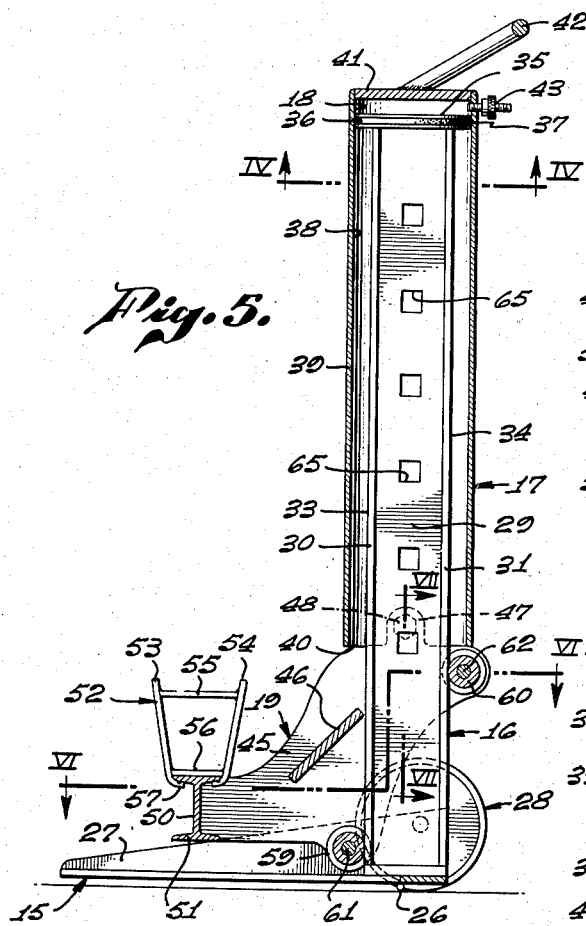
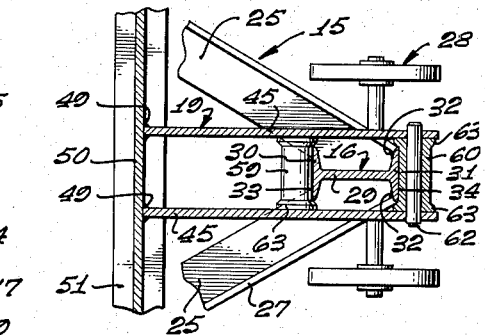
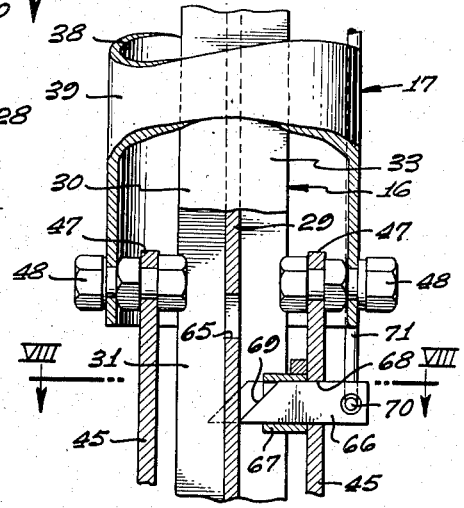
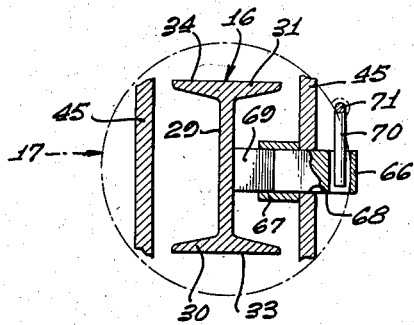
PRYOR G. CLOUD,
JOHN M. CLOUD,
INVENTORS.
BY
ATTORNEY.

United States Patent Office 2,868,501
Patented Jan. 13, 1959

2,868,501

PORTABLE FLUID-PRESSURE-ACTUATED JACK

Pryor G. Cloud and John M. Cloud, Manhattan Beach, Calif., assignors, by mesne assignments, to Life Time Products Corp., West Los Angeles, Calif., a corporation of California Application May 24, 1954, Serial No. 431,675

2 Claims. (Cl. 254—93)

This invention relates to a portable fluid-pressure-actuated vehicle lift means and more particularly to a jack means for engagement with a vehicle bumper bar to lift one end of a vehicle.

It is often desirable to lift one end of a vehicle body in order to inspect and repair parts of the vehicle located below the body. For this purpose, various forms of vehicle jack means have been provided which are adapted to engage the bumper of a vehicle as well as the axle of a vehicle. Because such bumper jack means are located outwardly of the vehicle and offset from the point of application of the vehicle load on the jack means, such lift or jack means must be sturdily and safely constructed.

This invention contemplates a fluid pressure-actuated bumper jack means which is of simple, strong, rigid, and sturdy construction. The bumper jack of this invention utilizes a structural steel section such as an "I" beam for a fixed vertical ram means. A vertically reciprocally movable cylinder means is cooperable with the ram means to provide a pressure chamber at the top of the ram means for receiving pressure fluid for raising a carriage means which is connected to the lower end of the cylinder means. The construction of the bumper jack means of this invention permits bumper contacting elements carried by the carriage means to be disposed in a low position for facilitating location of the bumper contacting elements beneath bumper bars of various makes of vehicles and for lifting a vehicle to a selected height.

It is, therefore, the primary object of this invention to disclose and provide a simple, inexpensively constructed fluid-pressure-actuated, portable vertically arranged vehicle lift or jack means.

An object of this invention is to disclose and provide a portable bumper jack means wherein a novel construction of a fixed upwardly directed ram means is utilized.

Another object of this invention is to disclose and provide a portable bumper jack means wherein safety latch means are cooperable with the ram means and are arranged for safely and releasably locking the jack means in selected position.

A further object of this invention is to disclose and provide a carriage means for such a jack means which is provided with longitudinally spaced roller means for engaging and for being guided by fixed ram means of the jack means.

These and other objects of this invention will be readily apparent to those skilled in the art from the following description of the drawings in which an exemplary embodiment of this invention is shown.

Fig. 5 is a sectional view taken in a vertical plane virtually bisecting the jack means shown in Fig. 1.

Fig. 6 is a transverse sectional view taken in the planes indicated by line VI—VI of Fig. 5.

Fig. 7 is an enlarged fragmentary sectional view taken in the vertical plane indicated by line VII—VII of Fig. 5.

Fig. 8 is a transverse sectional view taken in the plane indicated at line VIII—VIII of Fig. 7.

Figure 1:
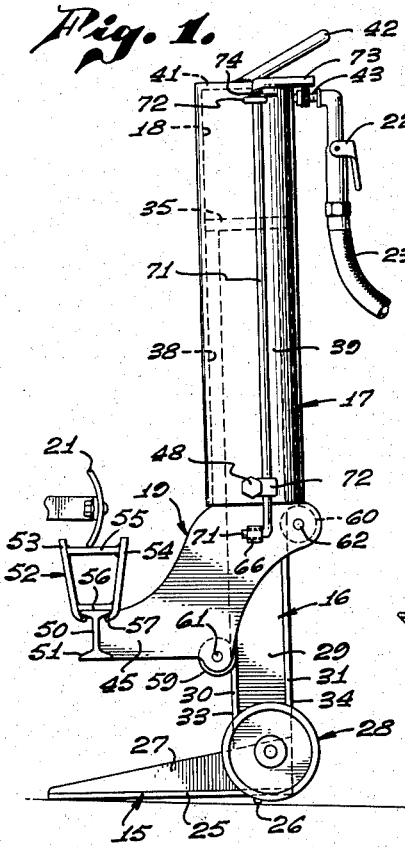
Fig. 1 is a side view of a jack means embodying this invention.
Figure 2:
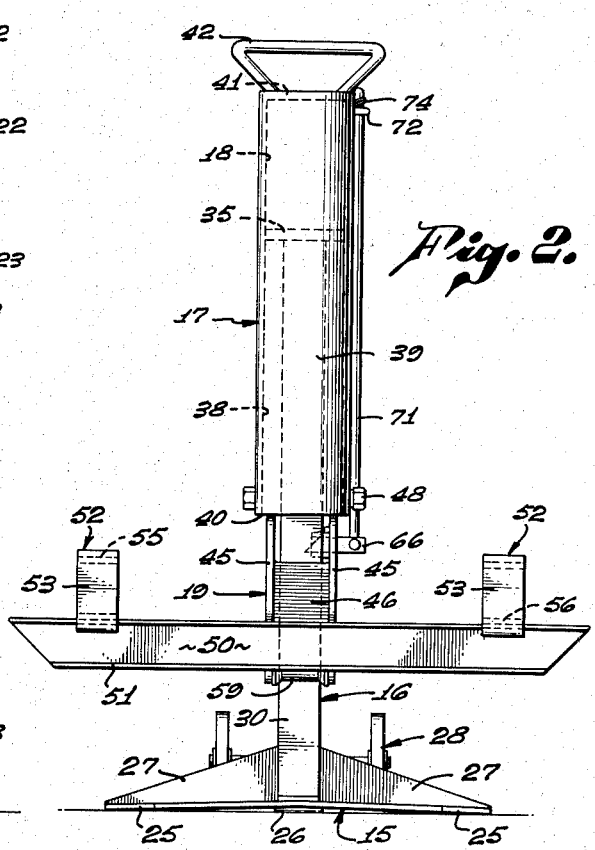
Fig. 2 is a front view of the jack means shown in Fig. 1.
Figure 3:
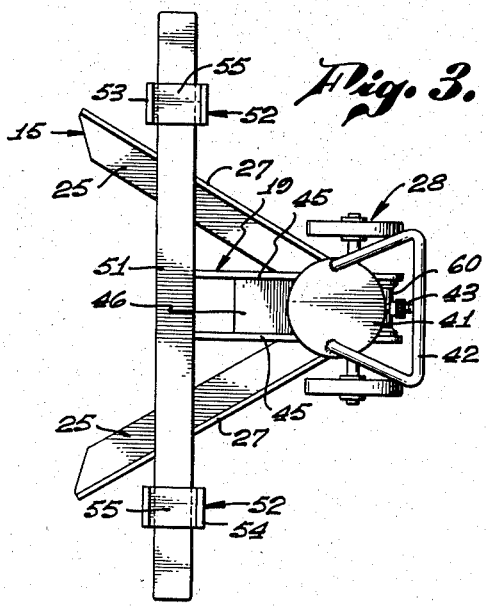
Fig. 3 is a top view of the jack means shown in Fig. 1.
Figure 4:
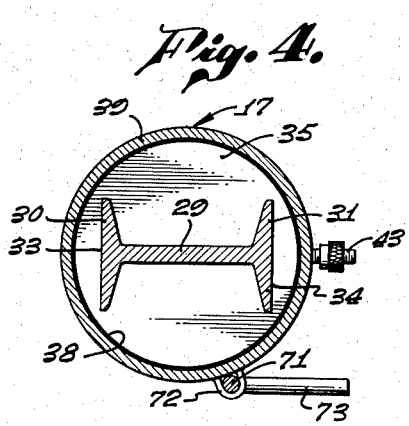
Fig. 4 is a transverse sectional view taken in the plane indicated by line IV—IV of Fig. 5.

Referring first to Figs. 1 and 2, the fluid-pressure-actuated vehicle lift or bumper jack means of this invention generally comprises a base means 15, an upwardly directed fixed ram means 16 secured to the base means, a cylinder means 17 reciprocally movable along the ram means 16 and defining therewith a pressure chamber 18, and a carriage means 19 supported by the lower end of the cylinder means 17 and having rolling guided engagement with the ram means 16. The carriage means 19 may support in spaced relation to the ram means 16 a bumper 21 of a vehicle. Suitable valve means 22 may be provided in a conduit 23 connected to the cylinder means 17 for introducing and releasing fluid pressure to the pressure chamber 18.

In detail, the base means 15 may comprise two angularly arranged converging angle section base elements 25 forming a V-shaped base. The base elements 25 may be of any suitable length and may be welded together at the apex of the V-shaped base. Each base element 25 includes an upstanding flange 27 tapered from an outer small end to a large inner end at the apex of the V-shaped base.

At said apex, a foot element 26 may be secured to the bottom surface of the base elements 25 and lying transverse to the plane bisecting the included angle of the base elements 25. The foot element 26 serves to forwardly tilt the bumper jack means so that in operative position, the jack means tends to lean slightly toward the vehicle which it is to raise.

The base means 15 may carry adjacent the apex thereof a wheel and axle assembly 28. The diameter of the wheel and location of the axis of the assembly 28 are selected so that when the jack means are tipped rearwardly, the wheels will contact the supporting surface for jack means. In operative lifting position, the wheels are out of contact with the supporting surface because of the foot element 26.

The upwardly directed ram means 16 may comprise a preselected length of an "I" section structural member, said "I" section member including a web 29 extending between and connecting front and back flanges 30 and 31. The web 29 is positioned in a plane which bisects the included angle formed by the base elements 25. The lower portion of the back flange 31 may be welded to the adjacent portions of the tapered flange 27 as at 32 (Fig. 6). The bottom edge of the web 29 may likewise be welded to the base elements 25 at their juncture at the apex of the V-shaped base. It will be noted that web 29 of the ram means is thus disposed so as to resist bending of the ram means when under load.

The flanges 30 and 31 of the ram means provide front and rear way means 33 and 34 having flat, parallel faces of uniform width extending for the entire length of the ram means. The parallel way means 33 and 34 cooperate with the carriage means 19 for guiding the cylinder means as later described.

At the top end of the ram means 16 is provided a circular ram head 35 of selected diameter, said ram head 35 being secured as by welding to the top edges of web 29 and flanges 30 and 31. The ram head 35 includes a circumferential groove 36 for receiving and holding an O-type seal ring 37 for sliding sealing engagement with internal cylindrical surfaces 38 of the cylinder means 17.

The cylinder means 17 comprises an elongated cylindrical member 39 having an open end 40 at its bottom adapted to receive therewithin the ram head 35. At its other end, the cylindrical member 39 is closed by an end wall 41 secured thereto as by welding. The end wall 41 may carry an upwardly and rearwardly directed U-shaped or bail handle means 42 for facilitating moving of the jack means. The pressure chamber 18 is defined by the upper face of the ram head 35 and the end wall 41. Introduction of pressure fluid to the pressure chamber 18 may be provided by a suitable fitting 43 secured in the wall of the cylindrical member 39 adjacent the end wall 41.

At the bottom end of the cylindrical member 39 is carriage means 19. The carriage means 19 may comprise a pair of spaced, parallel carriage plates 45 of any suitable configuration, said plates being connected together by a central web 46 extending therebetween and welded thereto. The upper end of each plate 45 includes an upstanding ear 47 adapted to be received within the bottom open end 40 of the cylinder means. Each ear 47 is ported and the adjacent portion of the wall of the cylindrical member 39 is provided with an aligned port for securing each carriage plate to the cylindrical member 39 as by a suitable bolt and nut assembly 48. The plates 45 extend forwardly of the ram means and their forward edges may be secured as by welding at 49 to a central portion of the web 50 of a transverse load bar 51 of "I" section.

The load bar 51 may be of any suitably selected length so as to provide desired transversely spaced load-bearing points for the object or vehicle to be lifted by the jack means. The top flange of the bar 51 slidably adjustably carries upwardly and outwardly flared load-contacting elements 52. Each load-contacting element 52 may comprise a pair of front and back walls 53 and 54 joined by vertically spaced transverse webs 55 and 56. The walls 53 and 54 extend below web 56 and may be bent inwardly at 57 to slidably grip parallel edge portions of the top flange of bar 51. The top webs 55 of the load-contacting elements provide a suitable seat for a lower edge portion of a vehicle bumper bar and the width between the top portions of walls 53 and 54 is such that ample space is provided for bumper bars of varying curvature.

The cylindrical member 39 and the carriage 19 are guided for coaxial, longitudinal movement with respect to the ram means by spool-shaped roller means carried by the carriage. The roller means include a front roller 59 and a back roller 60, said rollers engaging respectively the front and back way means 33 and 34 of the ram means. Rollers 59 and 60 are rotatably mounted on axles 61 and 62 held against rotation and carried by suitably aligned noncircular ports provided in the carriage plates 45. It should be noted that roller 59 contacts the front way means below bar 51 while the roller 60 contacts the rear way means above the point of load contact provided by the load-contacting elements 52. It should also be noted that each roller 59 and 60 are provided with radial end flanges 63 which extend between edges of way means 33 and 34 and inner surfaces of the carriage plates so that said roller means serve to guide and coaxially align the bottom end of the cylinder means with respect to the ram means.

Means for releasably locking the cylinder means 17 in a selected raised position along the length of the ram means 16 may be provided by a plurality of longitudinally spaced polygonal ports 65 formed in web 29 of the ram means 16. Cooperable with said ports 65 is a reciprocally transversely movable latching member 66 carried by one of the carriage plates 45 below a bolt and nut assembly 48 (see Fig. 7). The latch member 66 may be supported and guided by a sleeve member 67 secured to the inner surface of plate 45 and encircling an opening 68 in the plate through which the latch member extends. The latch member 66 may be of polygonal cross section similar to the ports 65 but somewhat smaller so as to facilitate entry of the inner end of the latch member into a port 65. The end of latch member 66 which enters a port 65 may be provided with an upwardly and outwardly inclined bevelled face 69 whereby as the cylinder means 17 is raised upwardly, the latch member 66 will automatically be slidably retracted from a port 65 by contact of said inclined face with the upper edge of a port 65.

The latch member 66 is provided with a ported outer end for connection to a bent end portion 70 of a rotatable latch release rod 71, said rod extending parallel to the cylinder means 17 and retained in such position by longitudinally spaced ported keepers 72. The upper end of rod 71 is provided with a laterally extending handle portion 73 and between said handle portion 73 and the upper keeper 72 may be provided a spring means 74 for normally biasing the latch member 66 inwardly and into latch engagement with a port 65. Actuating means for the jack means may comprise any suitable source of compressed fluid such as air. The source of fluid (not shown) is connected by conduit 23 to the fitting 43 and a valve 22 is provided therebetween for introducing and releasing compressed fluid to and from the pressure chamber 18. The valve 22 may be of well known manufacture and is not described in detail.

In operation the jack means may be conveniently positioned beneath a bumper bar 21 by rolling the jack means in rearwardly tilted position on the wheel and axle assembly 28 to a position adjacent to the bumper bar. In operative position, the base means is firmly seated on a supporting surface with the wheels of the assembly 28 out of contact with the surface because of the foot element 26. Upon actuation of the valve means 22, fluid pressure is introduced into the pressure chamber 18, thereby causing the cylinder means 17 to move upwardly in guided relationship with the ram means 16. The load-contacting elements 52 engage in selected spaced relation the lower edge of a bumper bar 21 and as the cylinder means and carriage continue to move upwardly, the end of the vehicle is raised. As lifting continues the latch member 66, being inwardly biased, slides along the surface of web 29 until it reaches a port 65. The latch member 66 snaps into each port 65. However, the cylinder means continues to move upwardly, the inclined face 69 on the latch member urges the latch member out of a port 65 to permit the cylinder means to continue its movement upwardly. When the desired height is reached and the valve means 22 is closed, the cylinder means is finally positioned with the latch member in latching engagement with a port 65. Thus if fluid pressure should be accidentally released from the pressure chamber, relative movement between the cylinder means 17 and the ram means 16 will be prevented by the latch member 66 and a vehicle in raised position will not be accidentally lowered.

Upward movement of the cylinder means is limited by contact of the top edges of ears 47 with the ram head 35 of the cylinder means. In such uppermost position, the roller means engage in spaced relation a substantial length of the ram means.

When it is desired to lower the elevated vehicle, the fluid pressure may be first increased to retract the latch member by engagement of inclined face 69 with an edge of the port 65. The latch means may then be held in retracted position by turning the latch rod handle 72. After withdrawal of the latch member the valve 22 may be opened so as to permit slow release of fluid pressure from the pressure chamber 18 and thus slowly lower the lifted end of the vehicle.

It will be readily understood by those skilled in the art that a simple, inexpensive construction of a bumper jack means is provided by the embodiment of this invention described above. The ram means provides way means for guiding and aligning the lower end of the cylinder means, provides a ram head for slidable engagement with internal surfaces of the cylinder means, and provides a means for cooperable engagement with a safety latch member so as to prevent accidental lowering of the cylinder means. The jack means is readily portable by the wheel and axle assembly and the handle means 42 provided on the top of the cylinder means.

It is understood that various changes and modifications which come within the spirit of this invention are contemplated hereby and all such changes and modifications coming within the scope of this invention are intended to be embraced thereby.

We claim:

1. In a fluid actuated jack means, the combination of: a base means provided with forwardly extending angularly arranged base members; an upwardly directed ram member secured to said base means at the apex of said angularly arranged base members, said ram member being of I-section and having longitudinally extending flanges providing flat, parallel front and back ways, said ram member including a web extending between said flanges and provided with a circular ram head at the top thereof having a diameter greater than the largest lateral dimension of the ram member; a reciprocally movable cylinder sleeved over said ram head and defining therewith a pressure chamber above said ram head and having an open end below said ram head; a carriage secured to the bottom end of said cylinder and extending therebelow in the direction of said base member and forwardly of the cylinder, said carriage including spaced plates having parallel portions extending into said open end of the cylinder and in close spaced relation to edges of the flanges; top and bottom roller means rotatably mounted between said plates and having roller end margins positioned between edges of said flanges and said plates for lateral alignment of the bottom end of the cylinder, said top and bottom roller means having longitudinal spaced engagement with associated back and front ways respectively on said ram member; said web on said ram member being provided with longitudinally spaced ports, a latch means carried by one of said plates for selective engagement with said ports; a transverse load bar supported by said plates in forward spaced relation to the cylinder; and means to introduce fluid under pressure to the pressure chamber for moving the cylinder and carriage relative to the ram member.

2. In a fluid actuated jack means, the combination of: a base means provided with forwardly extending angularly arranged base members; an upwardly directed ram member secured to said base means at the apex of said angularly arranged base members, said ram member being of I section and having longitudinally extending flanges providing flat, parallel front and back ways, said ram member including a web extending between said flanges and provided with a circular ram head at the top thereof having a diameter greater than the largest lateral dimension of the ram member; a reciprocally movable cylinder sleeved over said ram head and defining therewith a pressure chamber above said ram head and having an open end below said ram head; a carriage secured to the lower end of said cylinder and extending therebelow in the direction of said base means and forwardly of the cylinder, said carriage including spaced plates having plate portions extending in parallel spaced relation to edges of the flanges of said ram member; top and bottom roller means mounted for rotation between said plates and having roller end margins positioned between said flanges and said plate portions for limiting lateral movement of the bottom end of the cylinder relative to the ram member, said top and bottom roller means having longitudinal spaced engagement with associated back and front ways respectively on said ram member, said web on said ram member being provided with longitudinally spaced ports, a latch means carried by one of said plates for selective engagement with said ports; a transverse load bar supported by said plates in forward spaced relation to the cylinder; and means to introduce fluid under pressure to the pressure chamber for moving the cylinder and carriage relative to the ram member.

References Cited in the file of this patent

UNITED STATES PATENTS

| | | |
|---|---|---|
| 2,270,233 | Shaw | Jan. 20, 1942 |
| 2,487,508 | Anderson | Nov. 8, 1949 |
| 2,490,233 | Schildmeier | Dec. 6, 1949 |
| 2,654,568 | Pine | Oct. 6, 1953 |
| 2,664,073 | Pine | Dec. 29, 1953 |
| 2,669,422 | Branick | Feb. 16, 1954 |
| 2,740,607 | Branick | Apr. 3, 1956 |
| 2,763,465 | Tosi et al. | Sept. 18, 1956 |